US011702253B1

(12) United States Patent
White

(10) Patent No.: US 11,702,253 B1
(45) Date of Patent: Jul. 18, 2023

(54) INSECT TRAP LID FOR DISPOSABLE CUPS AND DRINKING CANS

(71) Applicant: Jesse Jonah White, Hardin, IL (US)

(72) Inventor: Jesse Jonah White, Hardin, IL (US)

(*) Notice: Subject to any disclaimer, the term of this patent is extended or adjusted under 35 U.S.C. 154(b) by 251 days.

(21) Appl. No.: 17/370,901

(22) Filed: Jul. 8, 2021

Related U.S. Application Data

(63) Continuation-in-part of application No. 17/126,539, filed on Dec. 18, 2020, and a continuation-in-part of application No. 29/762,713, filed on Dec. 17, 2020, now Pat. No. Des. 957,567.

(51) Int. Cl.
  *B65D 43/02* (2006.01)
  *B65D 47/06* (2006.01)
  *A01M 1/10* (2006.01)

(52) U.S. Cl.
  CPC ......... *B65D 43/0204* (2013.01); *A01M 1/103* (2013.01); *B65D 47/06* (2013.01); *B65D 2251/08* (2013.01); *B65D 2543/00092* (2013.01); *B65D 2543/00296* (2013.01); *B65D 2543/00444* (2013.01)

(58) Field of Classification Search
  CPC .. B65D 47/043; B65D 2251/08; A01M 1/103; A01M 1/106; A01M 1/10
  USPC ......................................... 220/719, 369, 287
  See application file for complete search history.

(56) References Cited

U.S. PATENT DOCUMENTS

| | | | | |
|---|---|---|---|---|
| 893,469 | A | * 7/1908 | Essmuller | B65D 41/02 215/319 |
| 1,018,277 | A | * 2/1912 | Suhre | A01M 2200/011 43/65 |
| 1,867,252 | A | * 7/1932 | Crigler | A01M 1/103 43/121 |
| 3,157,304 | A | 11/1964 | Judge | |
| 3,606,074 | A | * 9/1971 | Hayes | B65D 43/0222 215/393 |
| 3,655,089 | A | 4/1972 | Tower | |
| 3,851,417 | A | * 12/1974 | Wunsche | A01M 1/02 43/121 |
| 4,934,558 | A | 6/1990 | Vargas | |
| 5,678,720 | A | 10/1997 | Van Melle | |
| 6,112,452 | A | * 9/2000 | Campbell | A01M 1/04 43/107 |

(Continued)

FOREIGN PATENT DOCUMENTS

WO  2007065605 A1  6/2007

*Primary Examiner* — Jeffrey R Allen
(74) *Attorney, Agent, or Firm* — Creativenture Law, LLC; Dennis J M Donahue, III; Kevin Staed

(57) ABSTRACT

A lid releasably connects to the rim of a container, such as a soda can or a disposable cup, and functions with the container as an effective insect trap. In operation, the lid is attached to the top of the container with a funnel positioned over and extending towards the topside of the container such that an insect attracted to sugars within the can may crawl or fly from the surrounding space into the funnel and enter the container through the bottom of the funnel and thereby become trapped in the container. The sidewall of the lid can have multiple tiers that fit different sized cans or cups or can have a single tier. Regardless of the number of tiers in the sidewall, the sidewall's riser portion that fits over the container's rim is vertical and its interior surface does not have any concavity so no water-tight seal is formed.

20 Claims, 6 Drawing Sheets

(56) References Cited

U.S. PATENT DOCUMENTS

| | | | |
|---|---|---|---|
| 8,579,138 B2* | 11/2013 | Jamison | A47G 19/2222 220/254.1 |
| D888,877 S | 6/2020 | White | |
| 2008/0169287 A1* | 7/2008 | Auer | B65D 47/0847 220/287 |

* cited by examiner

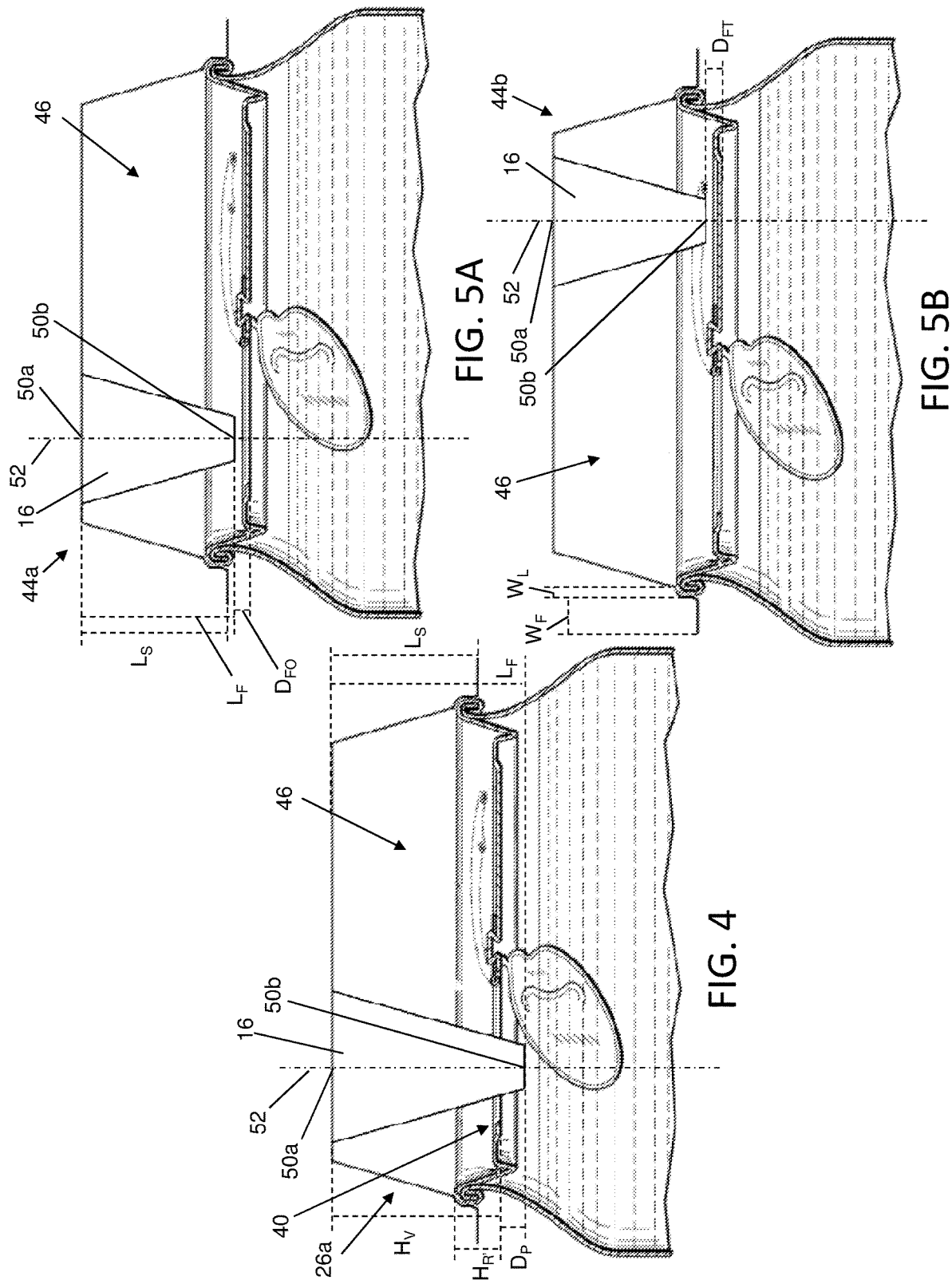

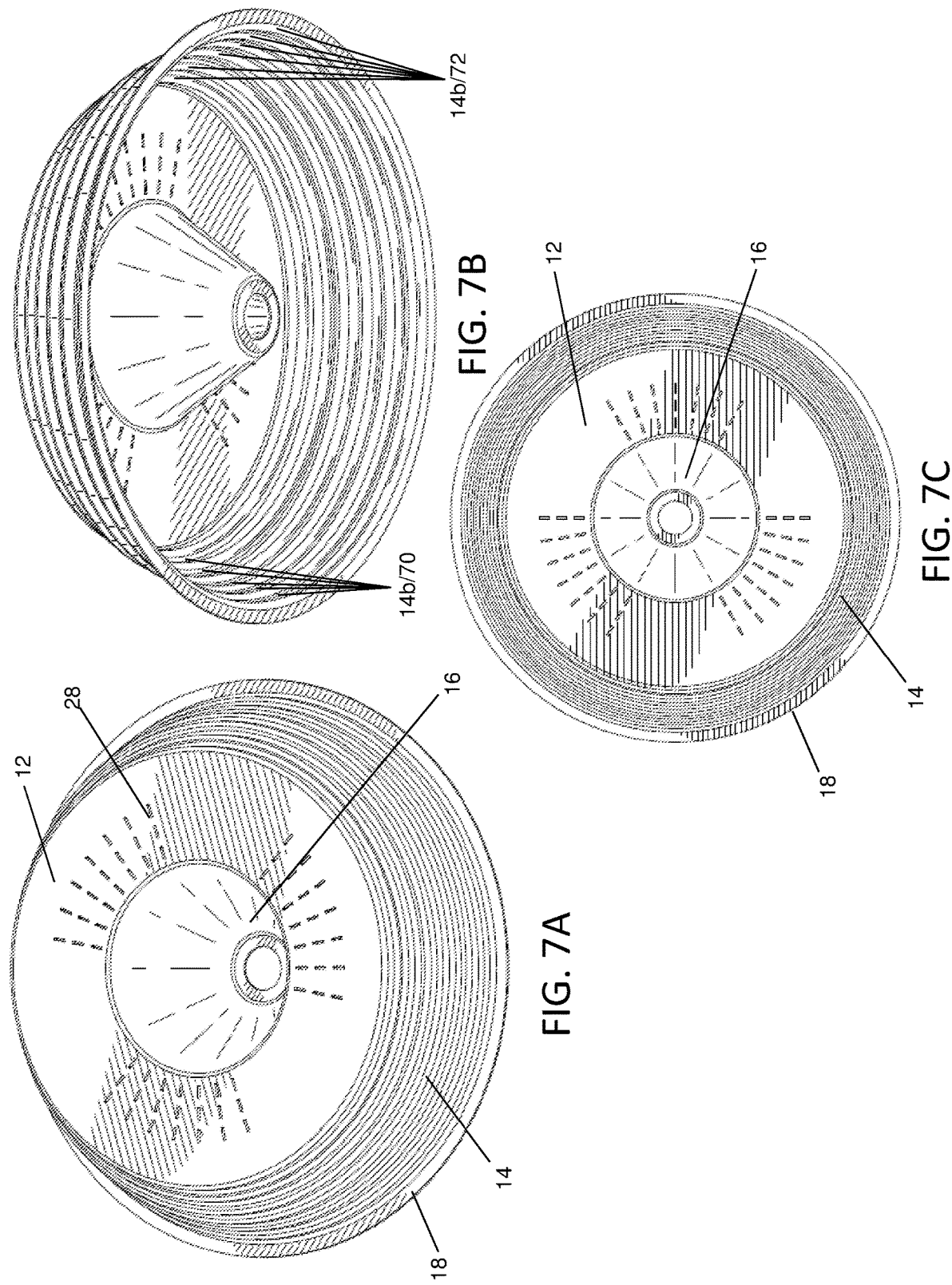

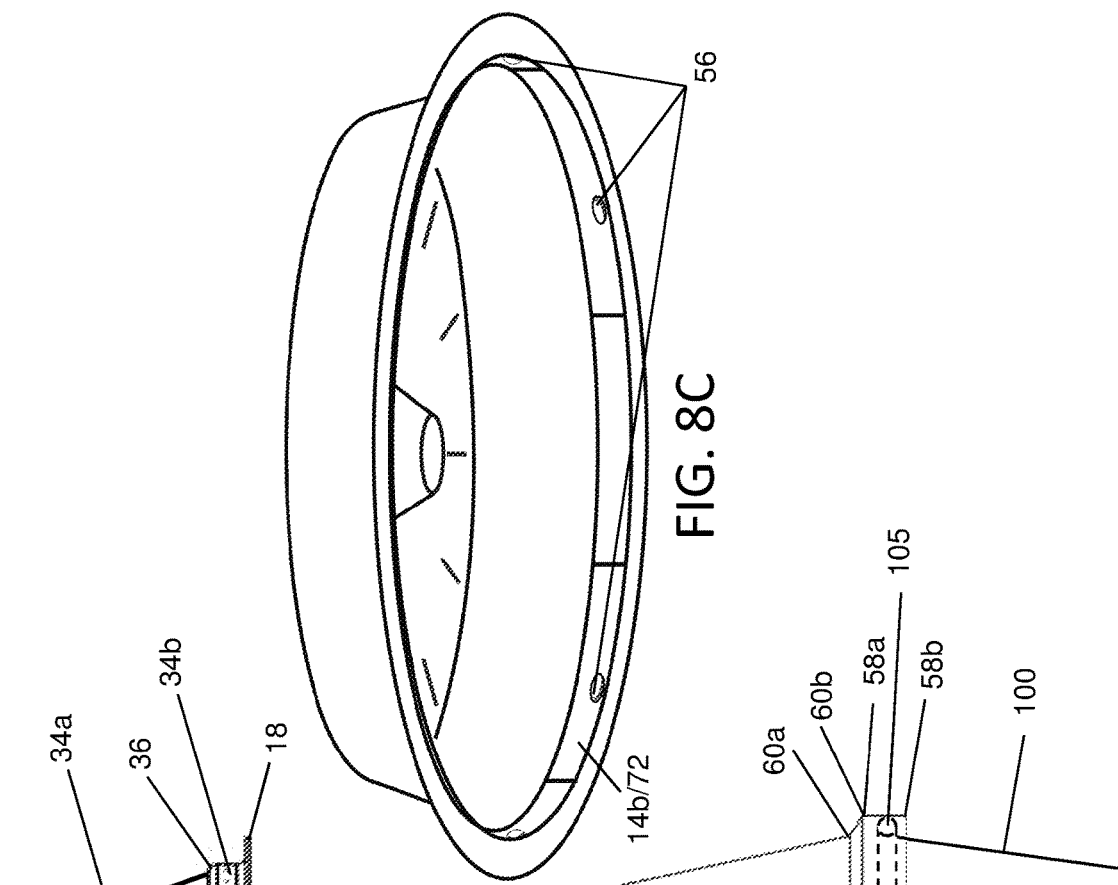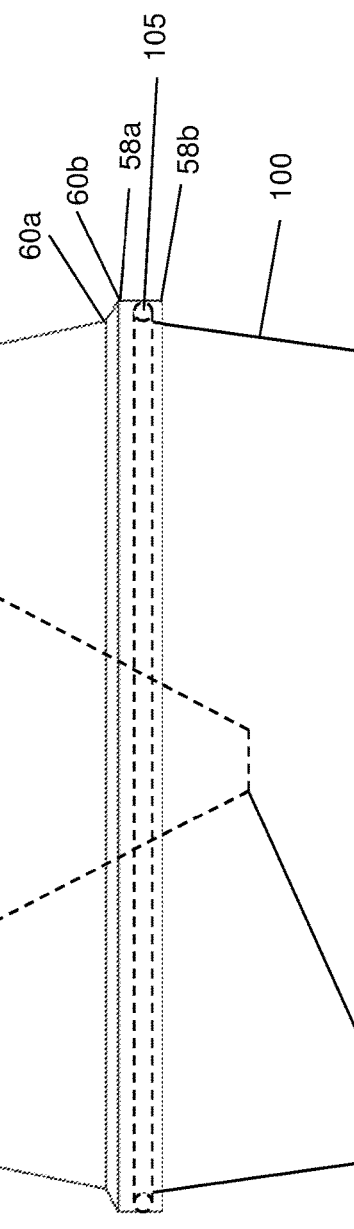

INSECT TRAP LID FOR DISPOSABLE CUPS AND DRINKING CANS

CROSS-REFERENCE TO RELATED APPLICATIONS

This application is a continuation-in-part of Ser. No. 29/762,713 filed on Dec. 17, 2020 and is a continuation-in-part of Ser. No. 17/126,539 filed on Dec. 18, 2020 which are both incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to a lid for a beverage container and more particularly to a lid that converts the beverage container into an insect trap.

Related Art

Adaptable lids have long been used on cans and other beverage containers to convert the container into an insect trap given the desire for a cost effective and reusable means for trapping flies, bees, wasps and other similar flying insects which can become a significant nuisance. Similarly, lids have been developed that connect to the top of a can or beverage container and thereby convert the container into an ash tray that allows ashes to be quickly and easily disposed of. For example, an empty soda could readily be converted into an insect trap by using a lid on the rim of the can to allow insects, attracted to the leftover sugars within the can, to crawl through a small opening and become trapped within the container given that they cannot crawl back out through the opening that is positioned within or proximate to the container opening. Further still, cans can also be readily converted into an ashtray by simply connecting a lid with an opening positioned above the opening of the container that allowed ashes to be deposited there through.

However, there remains a need in the art for an improved lid that can not only convert cups and containers with a large opening, such as polystyrene cup, into an insect trap but also effectively convert soda cans and similar containers with a smaller opening spaced from the center of the can top into an insect trap. Accordingly, the improved lid must be multifunctional and attachable to various container types that have differing top and opening designs.

There have been previous solutions to convert beverage containers into insect traps, such as US Pat. App. Pub. No. 2005/0072039 by Wong and U.S. Pat. No. D888,877 by White, which each teach lids that connect to the top of beverage containers and have a frustoconical opening protruding into the container. However, a problem exists with these inventions given the opening that allows insects to enter the container is centered on the lid and therefore cannot be effectively used on a soda can which has an opening spaced from the center of the container. Thus, there remains a need in the art for an improved lid which can operate with both open containers that do not have an open top, like a cup, as well as with cans that have a single opening spaced from the center of the can.

Another issue exists in these designs given that they cannot readily be sealed when insects are trapped therein without providing another separable cap, flap or similar device. In particular, embodiments of both the Wong invention and the White invention describe lids that rely on an insect's inability to find or access the small opening through which they entered the container to keep the insects trapped therein. For example, in each invention the opening significantly smaller than the opening of the container itself and is centered within the container so that it can only be reached by an insect that flies to the opening or climbs from the bottom of the container, up the sidewall and down the underside of the lid before it is able to escape.

Although the Wong reference teaches and describes alternative closing mechanisms and means for preventing insects from finding and escaping through the opening, such as a flap that can close the opening or a sticky substance within the container itself that traps the insect, these elements require additional items of manufacture or modification of the container itself. Furthermore, these additional trapping means cannot be readily controlled by the user and there subsequently remains a need for an improved lid that can be easily closed by the user and subsequently opened again without requiring additional mechanical features or external substances.

Another prior art reference is U.S. Pat. No. D780,992 by Lozier which shows an ashtray for a can that integrates similar principles of the insect trap lids described above but is particularly suited for use with a can. In particular, the Lozier invention is an adapter that releasably connects to the top of a can rim and has a frustoconical opening positioned above the can opening that allows ashes to be disposed into the can. Although similar in principle, the Lozier invention is incapable of functioning as a usable insect trap given the size and dimension of the frustoconical opening positioned over the opening of the container. In operation, the ashtray adapter functions to facilitate the passage of ashes from the topside of the ashtray and into the container and thereby requires a bottom opening in the smallest embodiment that is sized and shaped to approximately match the opening of the container on which it sits. Given the requirement for a proportionality sized bottom opening that allow ashes to enter the can, using the Lozier invention as a lid to convert the can into an insect trap would provide no benefit over simply trying to trap insects within the can without a lid because the size of the opening would not be reduced.

Furthermore, the ashtray in Lozier particularly requires a top opening in the frustoconical passage from the top of the ashtray to the can opening that is aligned with the center of the ashtray itself. In operation, the center set top opening catches ash that may be deposited into the ashtray from any point around the perimeter of the ashtray. Further, the top ring of the ashtray surrounding the top opening is angled downwards to assure that all ashes deposited into the tray funnel into the container.

While the size and dimensions of the opening could vary relative to the container opening, the fundamental principle of operation of the Lozier invention requires that the opening be as large as permitted by the opening of the container to facilitate the easiest passage of ashes from the lid into the can. Thus, the bottom end of the frustoconical opening proximate to the opening of the can could not be reduced to a size that would effectively prevent insects from exiting the container itself and thereby would not allow the Lozier invention to operate as an effective insect trap without necessarily changing its principle of operation.

There are also cup lids that are known to fit on different sized containers with some having a single tier with multiple concentric grooves that form different sized lips in the relatively flat lid while others having a multi-tier configuration with stepped lips. U.S. Pat. No. 5,678,720 by Van Melle and WIPO PCT Pub. No. 200706560 by D'Amato particularly describe lids having lids with tiered sidewalls that can be used with cups and cans of varying sizes. However, a problem exists in these designs given each tier within the sidewall necessarily requires a concave shape to securely clamp around the rim of the container. The concave portion of the sidewall is effective at affixing the lid to the container and provides a water-tight seal between the lid's sidewall and the cup's rim. To provide a water-tight seal, these lids are used with lids that have a rim diameter and thickness that can effectively nest within the concave tier. Furthermore, these designs require more complex and costly molds which inherently make them less desirable than an alternative multi-tier design that is less complex and less expensive to produce, not limited by rim thickness and is universal across most, if not all, can and container designs.

In addition to the shortcomings discussed above, another problem exists in products in the prior art that include a sloped sidewall but which do not necessarily provide a water-tight seal, such as shown in US Design Pat. D888,877. Although this lid and similar designs can be loosely placed on the top of a container and effectively convert a container into an insect trap, the lid is secured by a frictional fit with a canted outwardly sidewall of the lid contacting a round rim of the container. When loosely placed on the container so there is no water-tight seal with the rim of the container, the canted sidewall does not have a firm friction fit and can be easily dislodged and thereby allow the insects to escape. If the user pushes down on the lid to effect a strong friction fit, a water-tight seal could be created between the canted sidewall and the rim of the container wherein the canted outwardly sidewall effectively functions as a concave recess which grips the rim of the container in a similar manner to designs having a concave section described above. In such an instance, no ventilation is provided around the rim of the container and insects are less likely to be attracted to the container because the aroma is only escaping through the openings in the top of the lid. Accordingly, there remains a need for a lid that has a friction fit that is sufficient to keep the lid on the container but that does not provide a water-tight seal between the rim of the container and the lid.

SUMMARY OF THE INVENTION

The invention described herein is a lid that connects to the rim of a soda can in for converting the soda can into an effective insect trap. The lid includes a top disk and a circumferential sidewall along the perimeter of the disk with a lip on the bottom edge that attaches the lid to the rim of the container. The lid also includes a funnel on the top disk that is spaced an offset distance from the center point of the lid and positioned over the can opening when the lid is attached to the rim of the can.

In operation, the lid is attached to the top of a can with the funnel positioned over the opening of the can. Subsequently, an insect attracted to sugars within the can may crawl or fly from the surrounding space into the funnel and enter the can through the can opening situated beneath the funnel and thereby become trapped therein. The bottom opening of the funnel proximate to the opening of the can is sized to be smaller than the can opening to reduce the likelihood that an insect may crawl or fly back out of the bottom opening and escape from the trap.

Given soda cans and similar disposable containers come in various sizes, another aspect of an embodiment of the lid described herein includes a stepped sidewall with corresponding riser and step sections that allow the same lid to be used on containers of various sizes. Generally, the rim is seated against the step that matches the diameter of the container rim but the inner sidewall of the lid riser may be wedged against the rim and the lid can be loosely secured to the top of the container with a frictional force between the riser and the side of the rim rather than being seated on the top of the rim.

In another embodiment, the lid may include a single vertical section that is capable of more securely connecting the lid to the rim of the container without requiring a concave shape to securely clamp around the rim of the container. Although the single vertical sidewall limits the use of the lid to containers having rims that are approximately the same size as the diameter of the lid, the sidewall can flex to receive somewhat larger rims and securely hold the lid in place with a radial force being applied by the sidewall when the rim is wedged therein.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a side cross-sectional view of a lid embodiment attached to a container according to the invention described herein.

FIGS. 5A and 5B are side cross-sectional views of a lid embodiment attached to a container in an open orientation and a closed orientation, respectively, according to the invention described herein.

FIGS. 7A-7C depict another alternative lid embodiment according to the invention described herein.

FIGS. 8A-8C depict another alternative lid embodiment according to the invention described herein.

DETAILED DESCRIPTION OF THE PREFERRED EMBODIMENTS

Figure 1A:
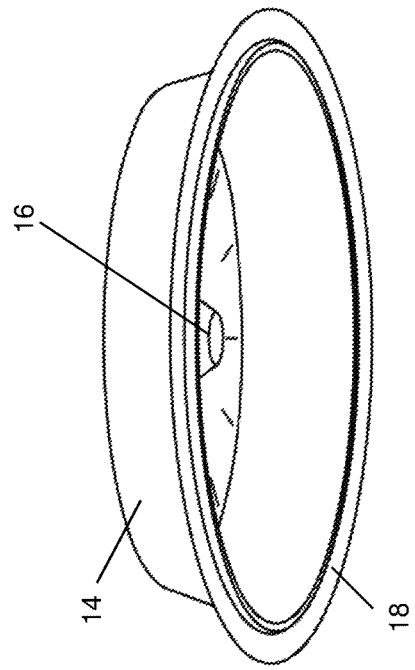
FIGS. 1A and 1B show perspective views of lids according to the invention described herein.
Figure 1B:
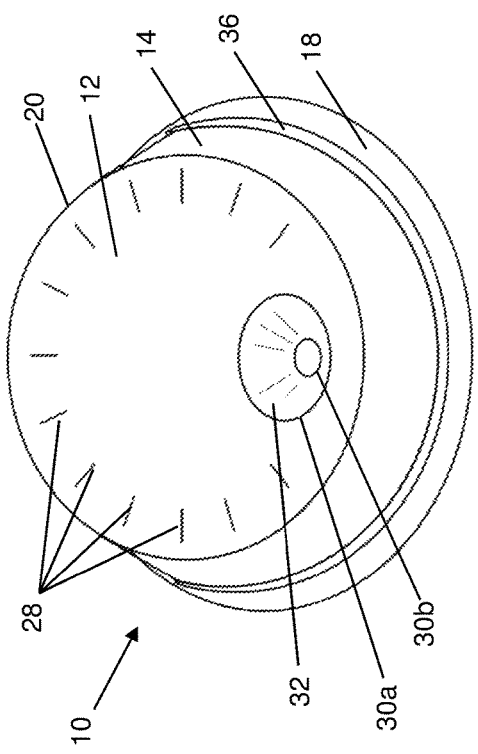

The following description of the preferred embodiment(s) is merely exemplary in nature and is in no way intended to limit the invention, its application, or uses.

The lid 10 described herein connects to the rim 105 of a container 100, such as a soda can, and converts the soda can into an effective insect trap. In operation, the lid is attached to the top of a can with the funnel positioned over the opening 110 on the topside 115 of the can such that an insect attracted to sugars within the can may crawl or fly from the surrounding space into the funnel and enter the can through the can opening situated beneath the funnel and thereby become trapped therein.

Figure 3:
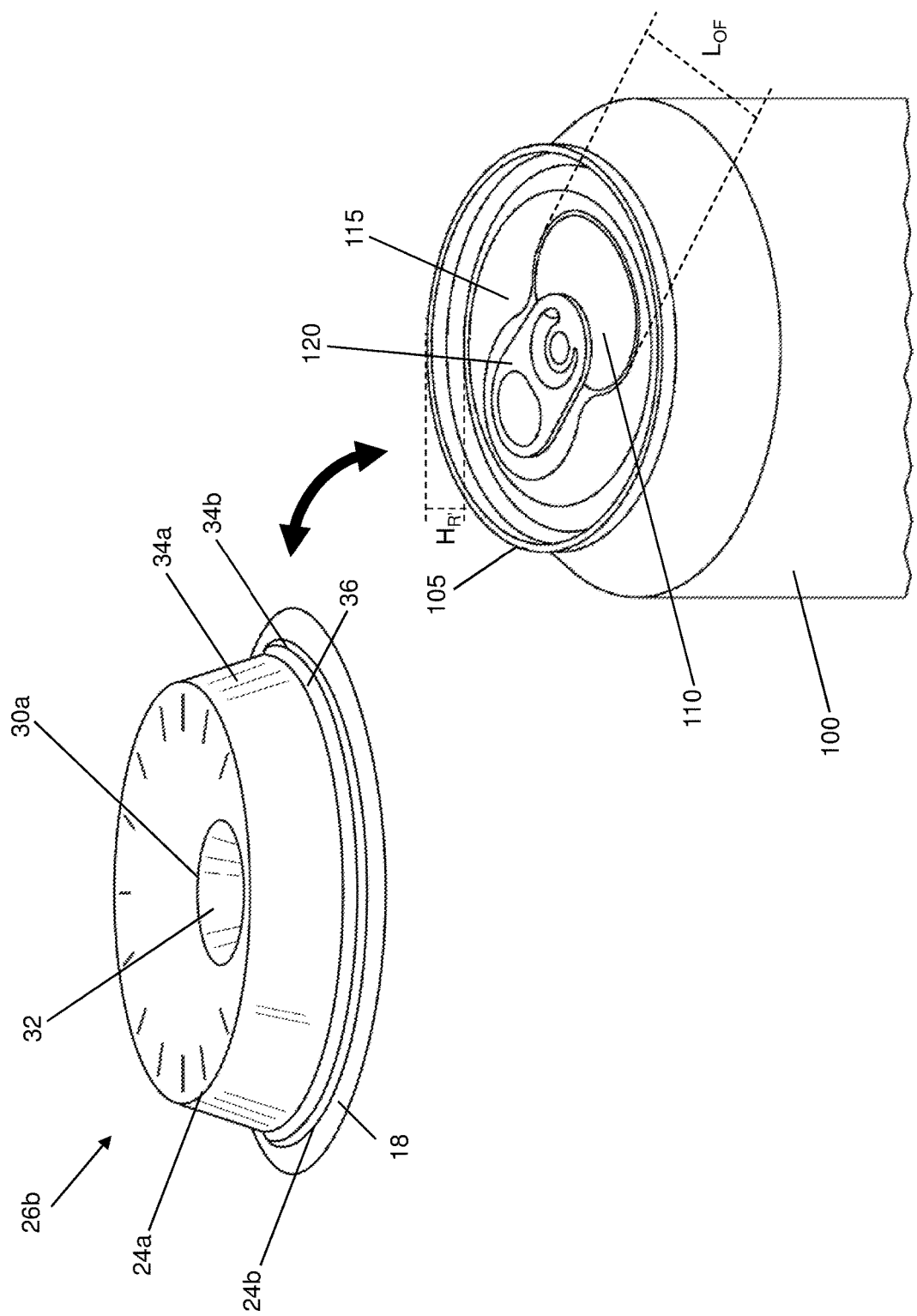
FIG. 3 depicts a lid detached from a container according to the invention described herein.

The lid includes a top disk 12 having a sidewall extending from the perimeter of the disk to the rim of the container when the lid is engaged therewith in an attached position 26a as best shown in FIGS. 4 and 5. Conversely, the lid can be disengaged from the rim of the container and detached therefrom 26b as shown in FIG. 3. The disk and sidewall of the lid in the preferred embodiment are circumferential in shape with a lid diameter ($D_L$) but may have an alternative forms that match the shape of the container on which the lid is intended to be used. For example, the lid may be a rectangular shape and still operate according to the invention described herein. Regardless of shape, the disk includes the outer perimeter 20, the center point 22, a top surface 12a and a bottom surface 12b with the funnel being situated between the perimeter and the center point and extending the funnel length from the bottom surface as further described herein.

Figure 2B:
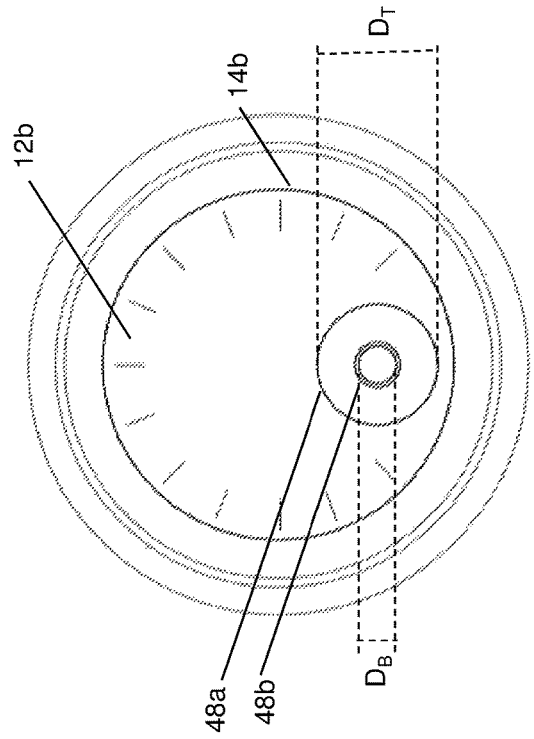
FIGS. 2A and 2B respectively show a top and bottom view of lids according to the invention described herein.
Figure 2A:
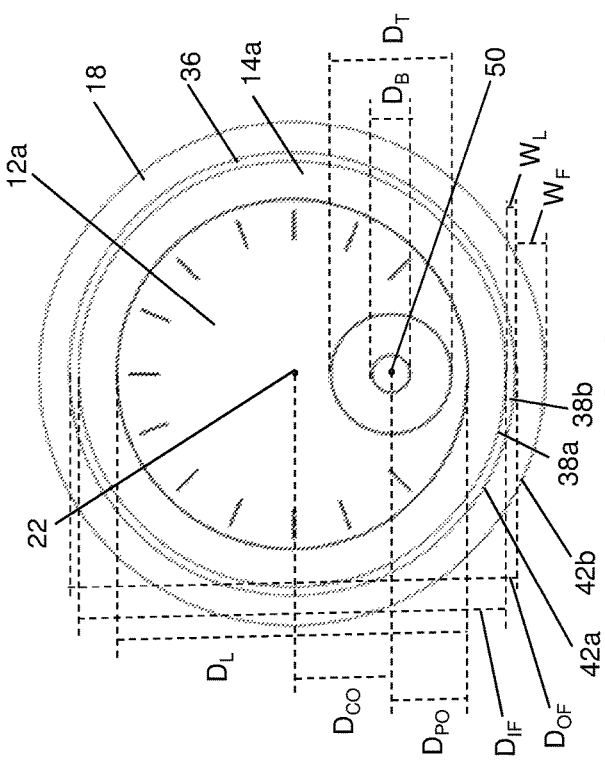

The sidewall 14 having an exterior 14a and interior 14b extends a sidewall length ($L_S$) from the top edge 24a connected along with perimeter of the disk to the bottom edge 24b. To releasably connect the lid to the rim of the container, at least one lip or step 36 is provided between the top and bottom edge of the sidewall, as illustrated in FIGS. 2A, 4 and 5, and separates the sidewall into an upper section 34a between the step and the top edge and a lower section 34b between the step and the bottom edge. To provide an effective bearing surface between the lid and the rim of the container that is along a plane substantially perpendicular to the sidewall of the lid, the lip radially extends a lip width (WL) from the inner edge 38a having an inner diameter ($D_{IF}$) that connects to the upper section of the sidewall to the outer edge 38b having an outer diameter ($D_{OF}$) that connects to the lower section of the sidewall. Accordingly, the inner diameter is less than the outer diameter and the lip is provided between the two. ($D_{IF}<D_{OF}$). Thus, when the lid is attached to the container the rim is seated against the lip and connected thereto by a frictional connection as shown in FIGS. 4 and 5.

In addition to a least one lip within the sidewall, a flange 18 is also provide on the bottom of the sidewall which radially protrudes a flange width ($W_F$) from the proximal edge 42a that is connected to the bottom edge of the sidewall to the distal edge 42b. In operation, the flange provides an additional gripping surface to allow the user to detach the lid from the container as shown in FIG. 3 or rotate the lid between the open and closed orientation in lid embodiments that permit such rotation as shown in FIGS. 5A and 5B.

The funnel 16 includes a top opening 30a within the disk and a sidewall 32 extending a funnel sidewall length ($L_F$) to the bottom opening 30b situated beneath the top opening and the disk. The funnel includes a frustoconical shape with the top opening having a diameter ($D_T$) that is larger than the diameter of the bottom opening ($D_B$), i.e., $D_B<D_T$. Although the particular diameters of the funnel openings will vary relative to the size of lid and container on which it is intended to be used, the diameter of the bottom opening is less than one half the diameter than the diameter of the top opening ($D_B<½ D_T$) and is preferably less than one-third the diameter of the top opening ($D_B<⅓ D_T$). Accordingly, an insect can readily enter the funnel through the larger top opening and follow the sidewall through the bottom opening before being trapped in the container.

As shown in the drawings, the top and bottom openings of the funnel are preferably circular in shape with respective centers 50a and 50b that align along a central axis 52. Accordingly, the sidewalls extend from the opposing perimeter edges 48a and 48b of the top opening and the bottom opening and the central axis of the funnel is more proximate to the outer perimeter of the disk than the center point of the disk as further explained below. The center 50a of the funnel's top opening is preferably positioned away from the center point 22 of the disk by an offset distance ($D_{CO}$) that is at least as great as the bottom opening's diameter ($D_B$) and is preferably more than twice the bottom opening's diameter.

According to the embodiments of the present invention which function with cans and other containers which have an opening positioned near the rim of the container rather than a fully open top as with a cup or a central opening, it is an aspect of the lid to have the funnel's center offset from the center point of the lid by a distance ($D_{CO}$) that is greater than the distance ($D_{PO}$) from the perimeter of the disk to the center of the funnel ($D_{CO}>D_{PO}$). Accordingly, when the lid is attached to the container, the funnel is positioned above the can opening and is spaced from the center of the can and insects can crawl or fly directly into the can through the bottom opening of the funnel when the axis of the funnel is aligned with the opening in the can.

As shown in FIG. 3, the can itself includes a topside, rim that extends a rim height ($H_R$) and an opening having an opening length ($L_O$) that is positioned beneath the lid when it is attached to the rim of the can. Although the size and dimensions of the container are not intended to be limiting, the lid according to the preferred embodiment will include a funnel with openings that are particularly sized relative to the container opening. For example, in the preferred embodiment the top opening of the container has a diameter that is approximately equal to the greatest dimension of the can opening. ($D_T \approx L_O$). Accordingly, in this preferred embodiment the diameter of the bottom opening is approximately one-third the greatest dimension of the can opening. ($D_T \approx ⅓ L_O$).

Thus, when the lid is attached the bottom opening either protrudes into the can opening or is positioned just above the above the opening of the can as further described below and a space 40 is provided between the perimeter of the opening and the bottom of the funnel that allows the insect to leave the can but still remain trapped in the volume 46 between the can rim, the topside of the can, the underside and the interior of the sidewall of the lid. As shown in FIGS. 4 and 5, this volume has a height ($H_V$) is preferably greater than the length of the sidewall but it will be appreciated that the height of the volume may vary in alternative embodiments, such as that depicted in FIG. 6. In particular, the height between the underside of the disk and topside of the can will change depending on which lip is used to attach the lid to the rim of the container. For example, when the lip most proximate to the bottom edge is used, such as shown in FIGS. 4 and 5, the height of the volume will be greater than the length of the sidewall. ($H_V>L_S$). However, if a smaller can is used and the lip most proximate to the top edge of the sidewall seals against the rim of the can, the height between the between the underside of the disk and topside of the can will be less than the length of the sidewall. ($H_V<L_S$).

In the embodiment depicted in FIG. 4 the funnel extends from the underside of the disk to the bottom opening that protrudes a distance ($D_P$) into the opening of the container. In such an embodiment the length of the funnel is therefore greater than the length of the lid sidewall such that a portion of the height of the rim ($H_R$) also forms a boundary of the insect trap that can only be accessed through funnel. ($L_F > L_S$). Such an embodiment offers a particular improvement over traps in the prior art given that the only point through which an insect may exit the trap is suspended beneath the opening of the container and can therefore only be accessed by a flying insect. Furthermore, the size of the funnel opening positioned within the opening of the container is approximately one-third the size of the can opening, as explained above, and insects are therefore more likely to exit through the can opening and remain trapped in the space above the can than exit through the bottom of the funnel.

In the alternative embodiment shown in FIGS. 5A and 5B, the length of the funnel is approximately equal to the length of the lid sidewall and the lid can rotate between an open and closed orientation. ($L_F \approx L_S$). As shown in FIG. 5A, the lid is attached to the rim and the bottom of the funnel is situated above the can opening and spaced a distance ($D_{FO}$) therefrom. In this open orientation 44a insects can travel through the funnel and into the container or space between the topside of the container and underside of the lid. Subsequently, the lid can be rotated atop the rim of the container into the closed orientation where the funnel is removed from the can opening and positioned above the top surface of the can by a distance ($D_{FT}$) as shown in FIG. 5B. Rotating the funnel away from the opening before throwing out the can with the lid can help prevent insects trapped in the can from escaping, such as when the can lays on its side in a trash basket and there remains soda in the can. It will also be appreciated that the bottom opening is sized so that only small portion of the topside of the can is necessary to close the lid given that a tab 120 could limit the amount of possible rotation on some cans. To prohibit most insects that may be trapped within the container and lid from escaping when the lid is rotated into the closed orientation 44b, the space between the topside of the lid and bottom opening is reduced to a distance that is less than one-half the diameter of the funnel's bottom opening. ($D_{FT} < \frac{1}{2} D_B$). Thus, although there is adequate clearance for the funnel as the lid rotates, the space in which an insect has to escape when the lid is closed is significantly reduced.

Furthermore, vent apertures 28 are provided in the disk to allow additional ventilation and airflow into the container aside from the single opening in the bottom of the funnel. As shown in the drawings, these vent openings are preferably slits positioned proximate to the perimeter of the disk but may take any other shape or form provided that they are not so large that they could allow an insect to escape. Similarly, the material from which the lid is made is not intended to be limiting but is preferably a clear plastic that allows a user to see any insects that may have entered the volume between the topside of the can and the lid so that they may take extra care when releasing or otherwise disposing of the insects within the trap.

Figure 6B:
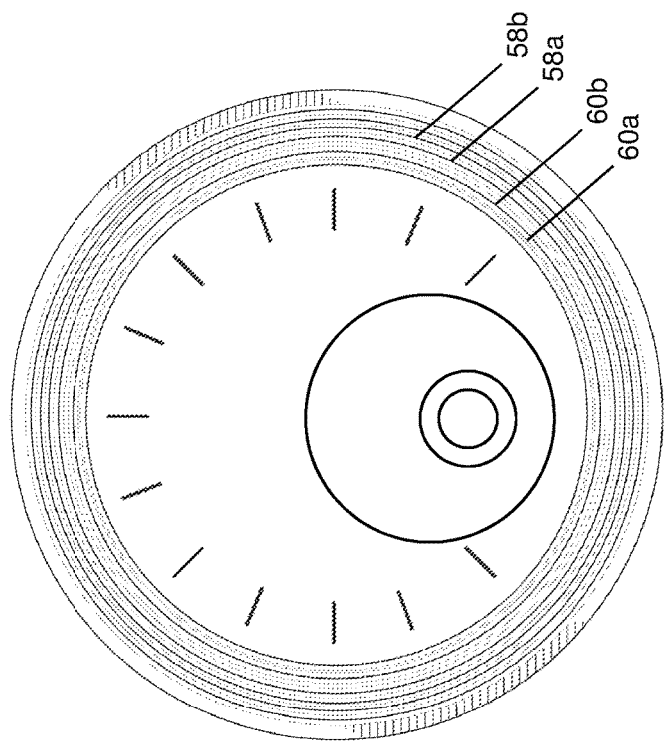
FIGS. 6A-6C depict an alternative lid embodiment according to the invention described herein.
Figure 6A:
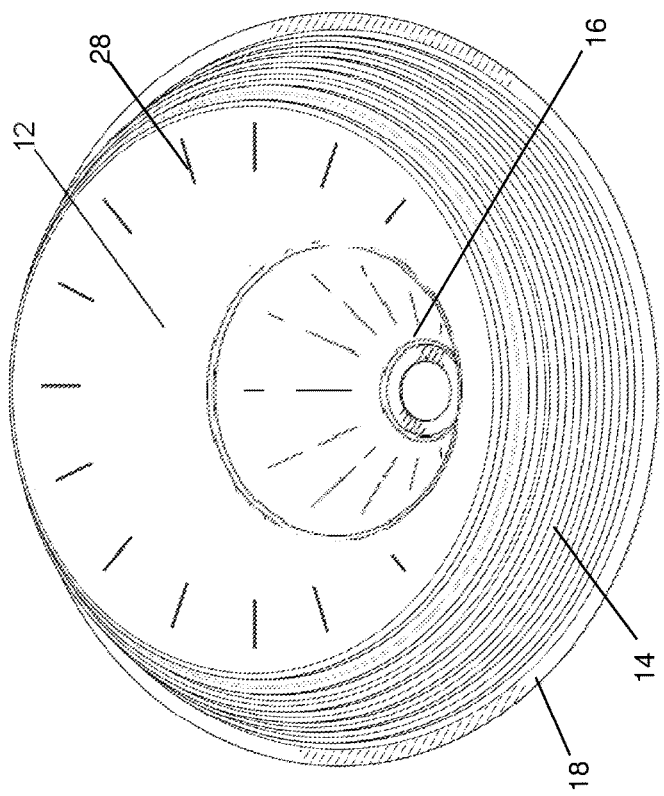
Figure 6C:
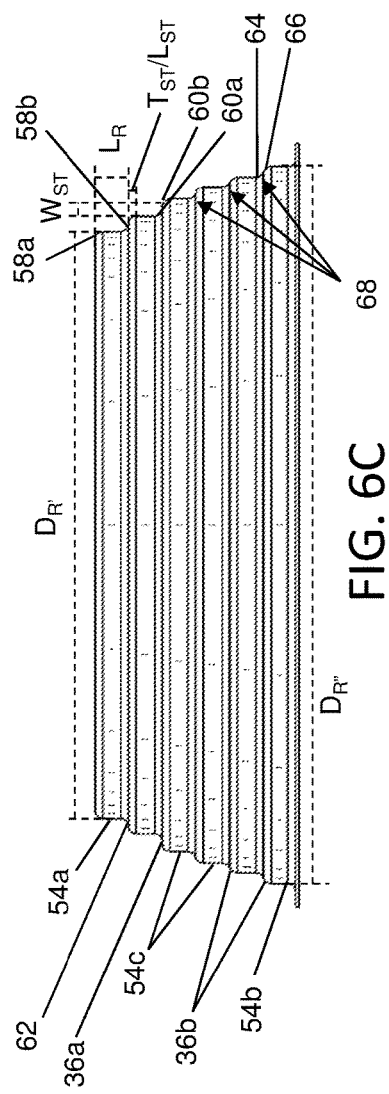

Although the lid according to the preferred embodiment includes a single lip or step proximate to the bottom edge as shown in FIGS. 1-5, an alternative sidewall design may incorporate a plurality of corresponding risers and steps that allow a single lid to be used on containers with different diameters, such as standard and stubby soda cans as compared with the smaller diameter sleek and slim cans used for some energy drinks and alcoholic beverages. Further, as evident from the drawings in the priority design patent application, the stepped design can also be incorporated into a lid that is used for cups of various sizes with open tops. In operation, the rim is seated against the step that matches the diameter of the container rim but may also be wedged against the interior wall of the riser in the attached position or removed from the rim in the unattached position. In particular, FIGS. 6A, 6B and 6C depict the alternative lid design which incorporates each of the inventive aspects of the preferred single lip design described herein but also which incorporates a plurality of risers and steps within the sidewall.

As with the single lip design described herein, each step in the tiered embodiment includes an inner diameter and an outer diameter. However, rather than having an upper sidewall section and a lower sidewall section on opposite sides of the lip the sidewall includes a plurality risers 54 and steps 36. The sidewall extends the sidewall length from the top edge connected around the perimeter of the disc to the bottom edge and the collective length of each riser ($L_R$) and step ($L_{ST}$) define the sidewall length ($L_R + L_{ST} = L_S$). As shown particularly shown in FIG. 6C, the preferred embodiment includes at least one horizontal step 36a and the step length is thereby defined by the thickness of the step ($T_{ST} = L_{ST}$). However, it will be appreciated that some of the steps in some of the embodiments may include a slope 36b between adjacent riser portions and thereby have a length that is that is not defined by the thickness of the step. In either case, the length of the sidewall is defined by the risers and steps with the length of the risers being approximately one sixth the length of the sidewall. ($\frac{1}{6} L_S \approx L_R$). Further still, so that the lid is not overly wide it will be understood that the riser length is preferably greater than the width of the step. ($W_{ST} < L_R$).

Each riser within the sidewall includes an upper edge 58a and lower edge 58b with the riser vertically extending the riser length therebetween. Similarly, each step includes an inner edge 60a and an outer edge 60b and the step radially extends a step width ($W_{ST}$) therebetween. As shown in FIGS. 6 and 7, the upper edge of the riser most proximate to the disc 54a defines the top edge of the sidewall and connects around the perimeter of the disc with the lower edge of the riser connecting to the inner edge of the adjacent step. Subsequently, the outer edge of the step radially extends away from the lower edge of the riser and connects to the upper edge of another riser. Thus, the inner edge of each step connects to the lower edge of a riser and the outer edge of each step connects to the upper edge of another riser 54c and the risers are thereby radially and vertically spaced from one another by the steps with the lower edge of the riser most distally spaced from the disc 54b defining the bottom edge of the sidewall. Furthermore, the sidewall includes a set of inflection points 62 respectively situated proximate to at least one of the inner and outer edge of each step.

In another particular aspect of the riser and steps that define the sidewall of the lid embodiment described, a convex arcuate section 64 may be provided to connect the lower edge of the riser to the inner edge of the step. Similarly, a concave arcuate section 66 may be provided to connect the outer edge of the step to the upper edge of the adjacent riser. Although these arcuate sections may thereby connect the vertical risers and preferably horizontal steps, it will be appreciated that there is no concave portion 68 within the length of the riser or step and there is similarly no concave portion between the lower edge of each respective riser and the inner edge of each respective step.

Considering the risers are vertical and the steps are preferably horizontal, the lid only loosely sits on the top of the rim and no water-tight seal is provided, such as in designs in the prior art that include concave portions to receive the rim. Instead, the tiered lid described herein may be easily used with varying container sizes even if the diameters of the various risers and steps do not perfectly match the diameter of the rim of the container on which it is used. In particular, the sidewall of the tiered lid includes concentric diameters that correspond with each separate riser portion. A first sidewall diameter ($D_{R'}$) is defined by the riser section most proximate to the disc which connects thereto at the upper edge and the remainder of the sidewall diameters concentrically increase as the sidewall extends to the bottom edge with the riser section most proximate to the bottom edge of the sidewall ($D_{R''}$) having the greatest diameter.

Although some of the steps may include a slope as explained above, at least one of the steps is horizontal and perpendicular to the risers that vertically extend between their upper and lower edges. In addition, the horizontal step or steps are thereby parallel to the disc portion along with the flange that may radially extend from the bottom edge of the sidewall. Because the risers are vertical and connect to preferably horizontal steps, it will be understood that the convex arcuate section that can be used to connect the risers to the steps assists with the attachment of the lid the rim. Rather than having a sharp angle, the curvature guides the lid onto the rim of the container until it is seated against the underside of the step 70 or interior side 72 of the riser that best corresponds with the diameter of the rim.

In another embodiment shown in FIG. 8, the sidewall may include a single vertical section without multiple steps separating the sidewall into separate vertical riser sections. In this embodiment a single step 36 may be provided which separates the sidewall into an upper section 34a and a lower section 34b. As with some uses of the tiered lid design described above and shown in FIGS. 6 and 7, this single vertical section design would allow the rim 105 to be wedged against the interior of the sidewall 14b as shown in FIG. 8B. Although more limited by container dimensions, this design would include the simplest mold when compared to the alternative designs described herein and shown in the prior art and thereby offers significant production advantages. The vertical sidewalls are also advantageous during the manufacturing process because they allow the units to be freed from the mold much easier than sidewalls which have concavity between the vertical portion of the lid's lip and the bottom of the lip which increases the production speed and reduces the production expense. Accordingly, the single vertical section design would still offer functional improvements over more complex designs in the prior art considering that it does not require a concave shape to securely clamp around the rim of the container.

Although the sidewalls of the alternative embodiment described herein are devoid of a concave section that seals the lid to the top of the container, protrusions may be provided on the interior surface of the sidewall that further secure the lid to the container without necessarily creating a water-tight seal. Such an embodiment is particularly suited for aluminum cans. As shown in FIG. 8C, a group of insets 56 radially protrude towards the center axis of the lid from locations along the interior surface of the vertical sidewall. In operation, these insets are wedged beneath the underside of the rim when the lid is attached thereto and the lid is thereby further secured to the rim of the container. The insets are annularly spaced from one another around the inner circumference of the sidewall with open spaces provided therebetween. Accordingly, the insets do not extend around the entire circumference and no seal is created when the lid is attached to the rim of the container.

The insets are preferably positioned proximate to the lower edge of the sidewall section such that there is sufficient space between the upper edge of the sidewall section and the top of the inset for the rim of the can to seat within. When attached, the topside of the rim contacts the underside of the lip, the outer side of the rim contacts the interior of the vertical sidewall and the underside of the rim contacts the insets. However, the inset length is less than the lip width such that the inset does not interfere as the lid is slid onto the top of the can. Furthermore, the limited number of insets spaced at different locations around the interior surface of the vertical sidewalls allows a user to quickly remove the lid without undue force that may be required with the sidewall itself is concave and the entire circumference of the rim is seated therein or when an annular inset is provided that extends along the entire circumference of the sidewall.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. In particular, it will be appreciated that the lid preferably functions as a trap lid for catching insects, such as flies, but may also function as cover for a spittoon container generally used with chewing and dipping tobacco. Thus, the breadth and scope of the present invention should not be limited by any of the above-described exemplary embodiments, but should be defined only in accordance with the following claims appended hereto and their equivalents.

What is claimed is:

1. A lid for attaching to a rim of a container, comprising:
a disk comprising an outer perimeter, a center point, and a plurality of vent apertures between the outer perimeter and the center point;
a sidewall comprising a top edge, a bottom edge, a plurality risers and a plurality of steps, wherein the sidewall extends a sidewall length from the top edge connected around the outer perimeter of the disk to the bottom edge, wherein each riser and each step are situated between the top edge and the bottom edge, wherein each riser comprises an upper edge and a lower edge and extends a riser length between the upper edge and the lower edge, wherein each step comprises an inner edge and an outer edge and radially extends a step width between the inner edge and the outer edge, wherein the inner edge of each step connects to the lower edge of an adjacent riser, wherein the outer edge of each step connects to the upper edge of another adjacent riser radially spaced the step width from the adjacent riser, wherein each riser is vertical between the upper edge and the lower edge, where an interior surface of the sidewall is devoid of any concavity between the lower edge of each respective riser and the inner edge of each respective step, and wherein the interior surface of the sidewall is seated against the rim of the container in an attached position and disengages the rim of the container in an unattached position; and
a funnel comprising a top opening, a bottom opening and a funnel sidewall, wherein the top opening comprises a first diameter, wherein the bottom opening comprises a second diameter, wherein the funnel sidewall extends a funnel length from the top opening connected to the disk between the outer perimeter and the center point to the bottom opening positioned beneath the disk.

2. The lid of claim 1, wherein the sidewall further comprises a plurality of inflection points respectively situated proximate to at least one of the inner edge and the outer edge of each respective step.

3. The lid of claim 1, wherein the sidewall further comprises a plurality of convex arcuate sections and a plurality of concave arcuate sections, wherein the convex arcuate sections are respectively situated between the lower edge of each respective riser and the inner edge of each respective step, and wherein the concave arcuate sections are respectively situated between the upper edge of each respective riser and the outer edge of each respective step.

4. The lid of claim 1, wherein the attached position is devoid of a water-tight seal between the sidewall and the rim.

5. The lid of claim 1, wherein the riser length is greater than the step width, and wherein the riser length is approximately one-sixth the sidewall length.

6. The lid of claim 1, wherein the sidewall further comprises a set of sidewall diameters corresponding with each of the plurality of risers, wherein a first sidewall diameter in the set of sidewall diameters most proximate to the outer perimeter of the disc is less than a remainder of the sidewall diameters in the set of sidewall diameters, wherein a second sidewall diameter most distal from the outer perimeter of the disc is greater than the first diameter and the remainder of the sidewall diameters, and wherein the remainder of sidewall diameters concentrically increase from the first diameter to the second diameter.

7. The lid of claim 1, further comprising a flange radially extending a flange width from a proximal edge connected along the bottom edge of the sidewall to a distal edge.

8. The lid of claim 1, wherein the plurality of risers are perpendicular to the plurality of steps and the disc, and wherein the plurality of steps are horizontal and parallel to the disc.

9. The lid of claim 1, wherein the vent apertures are positioned proximate to the outer perimeter of the disk.

10. The lid of claim 1, wherein a center of the top opening in the funnel is spaced from the center point of the disk by an offset distance that is at least as great as the second diameter.

11. The lid of claim 1, wherein a center of the top opening in the funnel is aligned with the center point of the disk.

12. A lid for attaching to a rim of a container, comprising:
a disk comprising an outer perimeter, a center point, and a plurality of vent apertures between the outer perimeter and the center point;
a funnel comprising a top opening, a bottom opening and a funnel sidewall, wherein the top opening comprises a first diameter, wherein the bottom opening comprises a second diameter, wherein the funnel sidewall extends a funnel length from the top opening connected to the disk between the outer perimeter and the center point to the bottom opening positioned beneath the disk; and
a sidewall comprising a top section, a bottom section and a step separating the top section and the bottom section, wherein the top section and the bottom section each comprise an upper edge and a lower edge, wherein the step comprises an inner edge and an outer edge and radially extends a step width between the inner edge and the outer edge, wherein the top section extends a top section length between the top section's upper edge connected around the disc's outer perimeter and the top section's lower edge connected around the step's inner edge, wherein the bottom section extends a bottom section length between the bottom section's upper edge connected around the step's outer edge and the bottom section's lower edge, wherein at least the bottom section is vertical between the bottom section's upper edge and the bottom section's lower edge, wherein an interior surface of the sidewall is seated against the rim of the container in an attached position and disengages the rim of the container in an unattached position, and wherein the attached position is devoid of a water-tight seal between the sidewall and the rim.

13. The lid of claim 12, wherein the sidewall further comprises a plurality of risers and a plurality of other steps connected between the respective upper edge and the lower edge of at least one of the top section and the bottom section, wherein each riser respectively comprises a riser upper edge and a riser lower edge and extends a riser length between the riser upper edge and the riser lower edge, wherein the respective inner edge of each of the plurality of other steps connects to the riser lower edge of an adjacent riser, wherein the respective outer edge of each of the plurality of other steps connects to the riser upper edge of another adjacent riser radially spaced the respective step width from the adjacent riser, wherein each riser is vertical between the respective riser upper edge and the riser lower edge, and where the interior surface of the sidewall is devoid of any concavity between the riser lower edge of each respective riser and the inner edge of each respective step.

14. The lid of claim 12, wherein the sidewall further comprises a convex arcuate section and a concave arcuate section, wherein the convex arcuate section is situated between the top section's lower edge and the inner edge of the step, wherein the concave arcuate section is situated between the bottom section's upper edge and the outer edge of the step, wherein the bottom section is comprised of a plurality of insets spaced around the interior surface, and wherein the interior surface of the bottom section is devoid of any concavity in the portions of the sidewall between the insets.

15. The lid of claim 12, further comprising a flange radially extending a flange width from a proximal edge connected along the lower edge of the sidewall's bottom section to a distal edge.

16. The lid of claim 12, wherein the top opening and the bottom opening each further comprise a circumferential perimeter and respectively comprise a top opening center and a bottom opening center equidistant from the circumferential perimeters, wherein the top opening center is spaced from the center point of the disk by an offset distance that is at least as great as the second diameter, wherein the funnel further comprises a center axis aligned with the top opening center and the bottom opening center, wherein the funnel sidewall connects between the respective circumferential perimeters, and wherein the center axis of the funnel is more proximate to the outer perimeter of the disk than the center point of the disk.

17. A lid for attaching to a rim of a container, comprising:
a disk comprising an outer perimeter, a center point, and a plurality of vent apertures between the center point and the outer perimeter;
a sidewall comprising a top edge, a bottom edge, a plurality risers and a plurality of steps, wherein the sidewall extends a sidewall length from the top edge connected around the outer perimeter of the disk to the bottom edge, wherein each riser and each step are situated between the top edge and the bottom edge, wherein each riser comprises an upper edge and a lower edge and extends a riser length between the upper edge and the lower edge, wherein each step comprises an inner edge and an outer edge and radially extends a step width between the inner edge and the outer edge, wherein at least one step is horizontal and parallel to the disc, wherein the inner edge of each step connects to the lower edge of an adjacent riser, wherein the outer edge of each step connects to the upper edge of another adjacent riser radially spaced the step width from the adjacent riser, wherein each riser is vertical between the upper edge and the lower edge, where an interior surface of the sidewall is devoid of any concavity between the bottom edge of each respective riser and the inner edge of each respective step, wherein the interior surface of the sidewall is seated against the rim of the container in an attached position and disengages the rim of the container in an unattached position, and wherein the attached position is devoid of a water-tight seal between the sidewall and the rim; and a funnel comprising a top opening, a bottom opening and a funnel sidewall, wherein the top opening comprises a first diameter, wherein the bottom opening comprises a second diameter, wherein the funnel sidewall extends a funnel length from the top opening connected to the disk between the outer perimeter and the center point to the bottom opening positioned beneath the disk.

18. The lid of claim 17, wherein the sidewall further comprises a plurality of convex arcuate sections and a plurality of concave arcuate sections, wherein the convex arcuate sections are respectively situated between the lower edge of each respective riser and the inner edge of each respective step, and wherein the concave arcuate sections are respectively situated between the upper edge of each respective riser and the outer edge of each respective step.

19. The lid of claim 17, wherein the riser length is greater than the step width, and wherein the riser length is approximately one-sixth the sidewall length.

20. The lid of claim 17, wherein the top opening and the bottom opening each further comprise a circumferential perimeter and respectively comprise a top opening center and a bottom opening center equidistant from the circumferential perimeters, wherein the top opening center is spaced from the center point of the disk by an offset distance that is at least as great as the second diameter, wherein the funnel further comprises a center axis aligned with the top opening center and the bottom opening center, wherein the funnel sidewall connects between the respective circumferential perimeters, and wherein the center axis of the funnel is more proximate to the outer perimeter of the disk than the center point of the disk.

* * * * *